US008167475B2

(12) United States Patent  
Katsumata et al.

(10) Patent No.: US 8,167,475 B2  
(45) Date of Patent: May 1, 2012

(54) LINEAR LIGHTING APPARATUS AND IMAGE READER USING THE SAME

(75) Inventors: Masayuki Katsumata, Kawasaki (JP); Azusa Shiratori, Tokyo (JP); Shuuichi Shimoda, Tokyo (JP); Masami Tabata, Naka-gun (JP)

(73) Assignee: Canon Components, Inc., Saitama-Ken (JP)

( * ) Notice: Subject to any disclaimer, the term of this patent is extended or adjusted under 35 U.S.C. 154(b) by 562 days.

(21) Appl. No.: 12/208,035

(22) Filed: Sep. 10, 2008

(65) Prior Publication Data

US 2009/0010020 A1    Jan. 8, 2009

Related U.S. Application Data

(63) Continuation of application No. PCT/JP2007/053156, filed on Feb. 21, 2007.

(30) Foreign Application Priority Data

Mar. 13, 2006  (JP) ................................. 2006-304892

(51) Int. Cl.  
*F21V 7/04* (2006.01)  
*G02B 5/12* (2006.01)

(52) U.S. Cl. ........ 362/610; 362/327; 362/335; 362/555; 362/623; 362/625; 359/515

(58) Field of Classification Search .................. 362/602, 362/610, 623, 625, 628, 327, 330, 335; 358/509; 359/515  
See application file for complete search history.

(56) References Cited

U.S. PATENT DOCUMENTS

| 5,499,112 | A | 3/1996 | Kawai et al. ................ 358/475 |
| 5,905,583 | A | 5/1999 | Kawai et al. ................ 358/484 |
| 5,965,870 | A | 10/1999 | Tabata ...................... 250/208.1 |
| 5,986,253 | A | 11/1999 | Tabata ...................... 250/208.1 |
| 6,002,494 | A | 12/1999 | Tabata ........................ 358/475 |

(Continued)

FOREIGN PATENT DOCUMENTS

EP    0 607 930 A2    7/1994

(Continued)

OTHER PUBLICATIONS

PCT Second and Supplementary Notice Informing the Applicant of the Communication of the International Application (To Designated Offices Which Apply the 30 Month Time Limit Under Article 22(1)) (Form PCT/IB/308) and International Search Report (Form PCT/ISA/210).

(Continued)

*Primary Examiner* — Diane Lee  
*Assistant Examiner* — Sean Gramling  
(74) *Attorney, Agent, or Firm* — Fitzpatrick, Cella, Harper & Scinto

(57) ABSTRACT

Conventional methods using two optical waveguide members are disadvantageous in cost because they require two optical waveguide members and pairs of their associated components. A linear lighting apparatus includes a rod-like optical waveguide member (100) formed by a transparent material, a light source placed near an end face of the optical waveguide member (100) in the longitudinal direction, and a light exit surface (101) formed on at least part of the optical waveguide member (100) in the longitudinal direction. A cross section of the optical waveguide member in the widthwise direction has a plurality of reflecting areas (102, 103) at positions to face a light exit surface (101) and a barrier (106) at a boundary portion between the reflecting areas (102, 103).

6 Claims, 15 Drawing Sheets

U.S. PATENT DOCUMENTS

| | | | |
|---|---|---|---|
| 6,055,072 A | 4/2000 | Tabata et al. | 358/509 |
| 6,081,351 A | 6/2000 | Tabata | 358/475 |
| 6,115,187 A | 9/2000 | Tabata et al. | 359/654 |
| 6,198,551 B1 | 3/2001 | Tabata | 358/514 |
| 6,204,938 B1 | 3/2001 | Horiuchi et al. | 358/484 |
| 6,326,602 B1 | 12/2001 | Tabata | 250/208.1 |
| 6,333,779 B1 | 12/2001 | Tabata et al. | 355/68 |
| 6,337,476 B2 | 1/2002 | Tabata | 250/208.1 |
| 6,360,030 B1 | 3/2002 | Kawai et al. | 382/312 |
| 6,473,154 B2 | 10/2002 | Tabata et al. | 355/41 |
| 6,479,812 B2 | 11/2002 | Tabata | 250/239 |
| 6,556,317 B2 * | 4/2003 | Tabata et al. | 358/509 |
| 6,661,497 B2 | 12/2003 | Tabata et al. | 355/69 |
| 6,858,837 B2 | 2/2005 | Tabata | 250/239 |
| 2005/0140835 A1 | 6/2005 | Maeda et al. | 349/28 |

FOREIGN PATENT DOCUMENTS

| | | |
|---|---|---|
| JP | 6-217084 | 8/1994 |
| JP | 2693098 | 9/1997 |
| JP | 10-190962 | 7/1998 |
| JP | 2848477 | 11/1998 |
| JP | 11-84137 | 3/1999 |
| JP | 11-266340 | 9/1999 |
| JP | 2001-159796 | 6/2001 |
| JP | 2005-94199 | 4/2005 |
| TW | 200424682 | 11/2004 |
| WO | WO 2005001529 A1 * | 1/2005 |

OTHER PUBLICATIONS

PCT Notification of Transmittal of Translation of the International Preliminary Report on Patentability (Chapter I or Chapter II of the Patent Cooperation Treaty) (Form PCT/IB/338), International Preliminary Report on Patentability (Chapter I of the Patent Cooperation Treaty) (Form PCT/IB/373), Written Opinion of the International searching Authority (Form PCT/ISA/237), regarding International Application No. PCT/JP2007/053156.

* cited by examiner

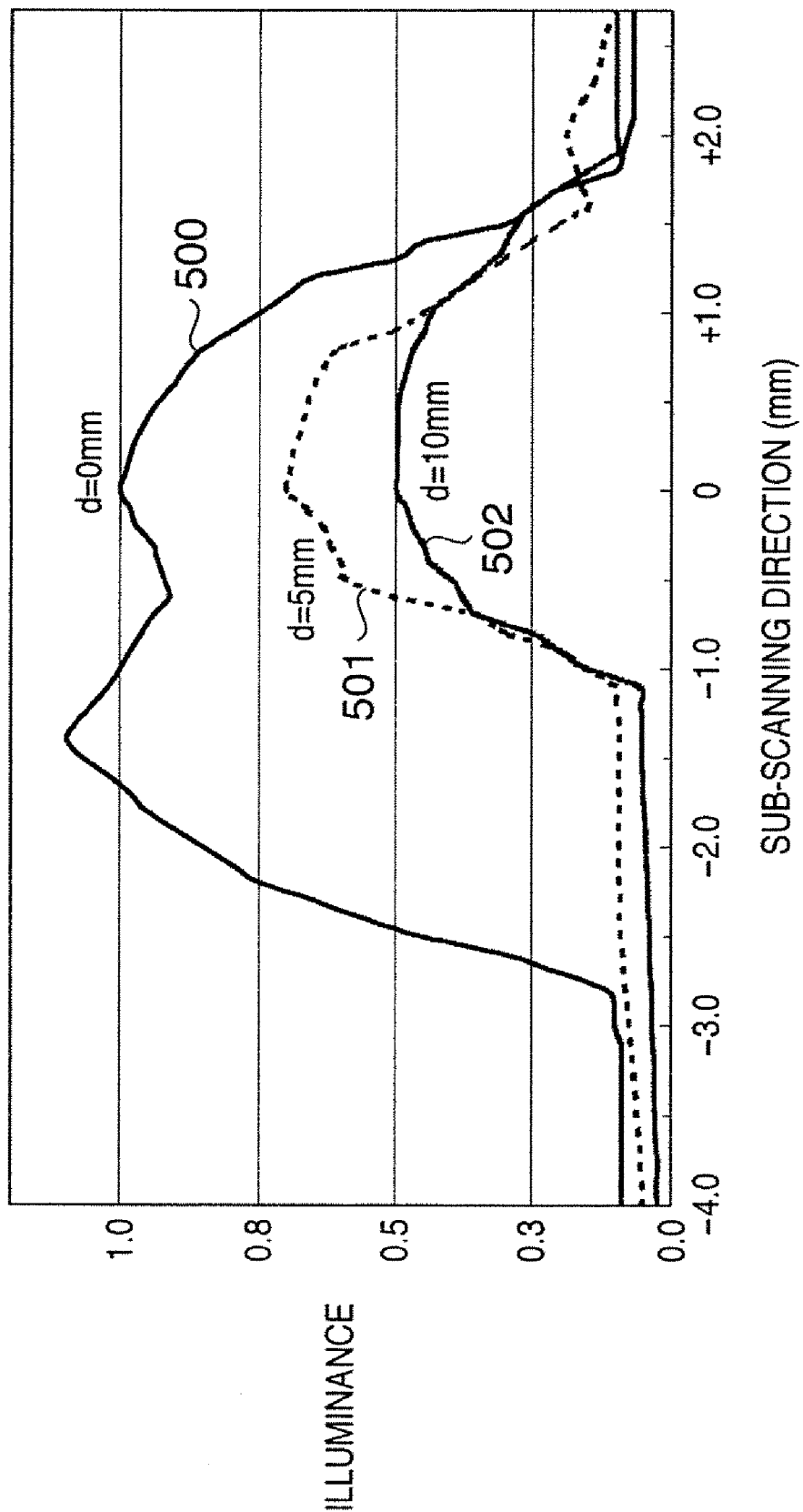

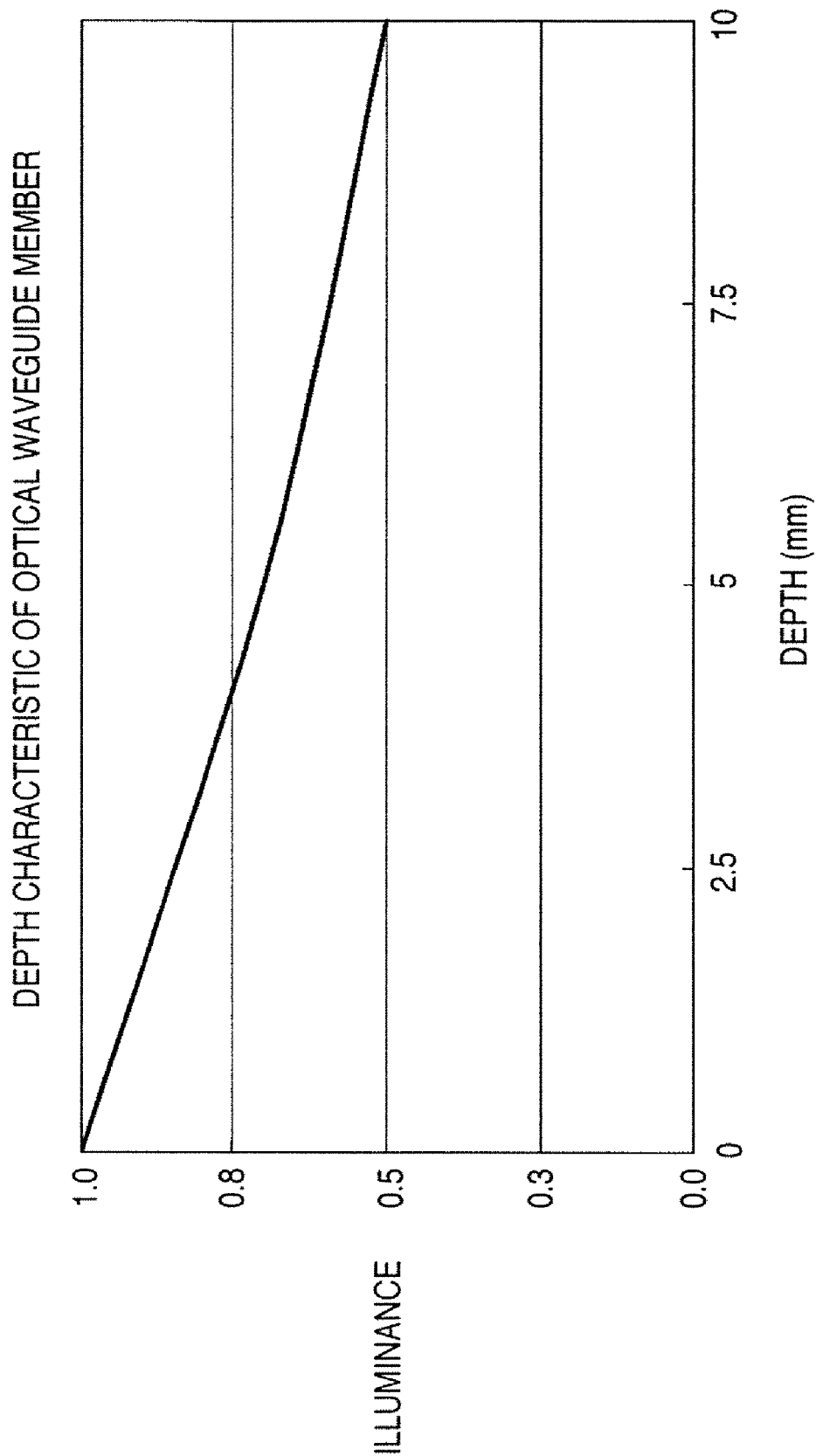

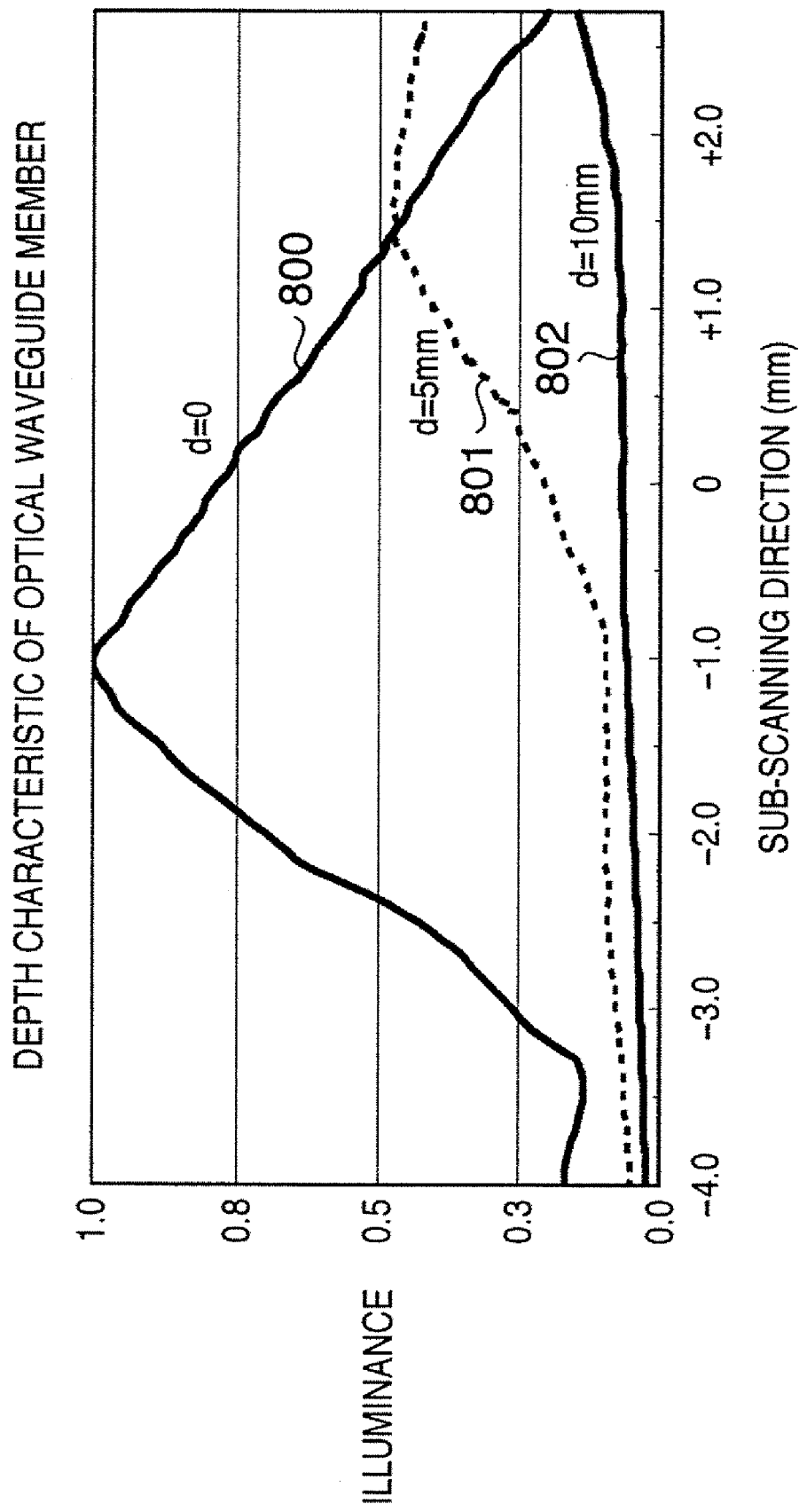

LINEAR LIGHTING APPARATUS AND IMAGE READER USING THE SAME

RELATED APPLICATIONS

This application is a continuation of the pending PCT/JP2007/053156, filed Feb. 21, 2007, which is incorporated by reference herein in its entirety, as if fully set forth herein.

TECHNICAL FIELD

The present invention relates to a linear lighting apparatus used in an image sensor unit which applies light to the read surface of a document and reads the reflected light, and an image reader using the apparatus.

BACKGROUND ART

Sensors such as reduction sensors or contact sensors are available as image sensors used in image readers such as image scanners and facsimile apparatuses. Of these sensors, a contact image sensor (to be abbreviated as a CIS hereinafter) comprises a lighting apparatus, a one-to-one image formation optical device, a line sensor, and the like. Such a CIS generally has a shorter optical path length than an image sensor using a reduction optical system, and hence allows easy reduction in the size of a device which incorporates the sensor. For this characteristic, such CISs have been often used in low-profile flatbed type image readers and the like in place of reduction optical systems. A linear lighting apparatus used in such a CIS is required to illuminate a document surface at a necessary illuminance and allow the light reflected by the document to reach the line sensor with a sufficient intensity.

FIG. 12 depicts a sectional view explaining the arrangement of a conventional contact image sensor. In this case, the sensor includes a single optical waveguide member 2. This contact image sensor includes a light source unit 1 for applying light to a document 9 and applies light from the light source unit 1 onto the document 9 via the optical waveguide member 2. The light applied in this manner is reflected by the document 9 and strikes a line sensor 5 comprising photoelectric conversion elements via a lens array 4. This light is converted into an electrical signal.

Referring to FIG. 12, reference numeral 3 denotes a frame which supports the constituent members. The line sensor 5 has light-receiving units in the form of a plurality of lines, which photoelectrically convert an optical image of the document into an electrical signal. Reference numeral 6 denotes a sensor board on which the line sensor 5 is mounted. Reference numerals 1-$r$, 1-$g$, and 1-$b$ respectively denote LEDs for applying light to the document 9 in the light source unit 1. These LEDs respectively emit red, green, and blue light beams. The LEDS are arranged on an end face of the optical waveguide member 2 which extends in the longitudinal direction. The optical waveguide member 2 is designed to receive light emitted from the respective LEDs and make an amount of illumination light almost uniform throughout the length of one line of a document reading unit. Reference numeral 7 denotes connector which connects a sensor signal to an external device; and numeral 8 denotes a document support table made of a transparent glass material, which supports the document 9.

The light emitted from the LEDs arranged on the end face of the optical waveguide member 2 is guided through the optical waveguide member 2 made of an acrylic material and exits outside from the light exit surface after being reflected in a complicated manner in the optical waveguide member 2. The light then illuminates the document 9. In order to reflect this light, it is preferable to place a titanium oxide powder or an aluminum powder on the reflecting surface or terminal end portion of the optical waveguide member 2 in advance by using a printing means or the like.

As this linear lighting apparatus, a linear lighting apparatus is used, which has light-emitting elements provided on one end portion of a rod-like transparent member made of an acrylic material with the central position of a reflecting surface being shifted from that of a light source (patent reference 1). In addition, an optical waveguide member having inside two surfaces with reflecting surfaces set at different angles (patent reference 2). The linear lighting apparatuses disclosed in these references are designed to achieve reductions in cost by arranging LEDs, which are light-emitting elements, on only one end of a rod-like transparent member. The shape of an optical waveguide member is also designed to obtain uniform illuminance along the longitudinal direction so as to obtain illuminance which is made as uniform as possible from one end which light from LED elements strikes to the other end.

Patent reference 3 discloses a technique of keeping the illuminance on a document surface almost constant within the depth-of-field range of an image formation means by arranging two light sources and vertically shifting the irradiation positions of the respective light sources on the optical axis of a light-receiving element. In addition, patent reference 4 discloses an optical waveguide member whose central portion is bifurcated into two portions so as to hold a lens array.

Patent reference 1: Japanese Patent No. 2693098
Patent reference 2: Japanese Patent Laid-Open No. 2001-159796 (FIG. 1)
Patent reference 3: Japanese Patent No. 2848477
Patent reference 4: Japanese Patent Laid-Open No. 11-266340

DISCLOSURE OF INVENTION

Problems That the Invention is to Solve

However, the above conventional optical waveguide members have the following problems.

Referring to FIG. 12, an arrow 1200 indicates the direction of a light beam. As shown in FIG. 12, the light beam 1200 is focused onto one portion of the document 9 due to a synergistic effect with the lens effect of the light exit surface.

FIG. 13 is a graph showing the depth characteristic of the optical waveguide member in the image sensor shown in FIG. 12. This graph represents an illuminance characteristic on a document support table 8 in the height direction. Referring to FIG. 13, the ordinate represents the relative illuminance corresponding to the length by which the document floats from the table, with the illuminance on the document support table 8 being "1.0". The abscissa represents the length by which the document floats from the document support table 8.

As is obvious from the light amount distribution shown in FIG. 13, the illumination light amount abruptly decreases at a portion slightly spaced apart upward (by about 2 mm) from the document support table 8. On the other hand, the range in which the lens array 4 shown in FIG. 12 can achieve image formation in the height direction is relatively narrow, and the limit of image formation is about several mm. Owing to these characteristics, the amount of reflected light focused onto the sensor array 5 via the lens array 4 is small, and hence sufficient image information cannot be obtained, at a portion of the document 9 which floats from the document support table 8, for example, the bound portion of a book in an open state.

If, therefore, the image read by such an apparatus is copied, the image of the corresponding portion is printed in black. In order to solve this problem, as disclosed in patent reference 3, there is available a method of equalizing the amount of light on a document table in the height direction by using two optical waveguide members and shifting their focal positions. This method, however, requires two optical waveguide members and pairs of their associated components, resulting in a disadvantage in terms of cost. In addition, the method demands high positioning accuracy of the optical waveguide members. As a consequence, complicated manufacturing steps are required, and the manufacturing load is large. Furthermore, the optical waveguide member disclosed in patent reference 4 is bifurcated into a symmetrical shape having two reflecting surfaces, which has a structure to hold the lens array. Like the conventional optical waveguide members, this structure is also configured to focus light onto one point on a document table.

It is an object of the present invention to solve the problems in the prior art.

According to a characteristic feature of the present invention, there can be provided a linear lighting apparatus which can have a large illumination depth on the read surface of a document with an arrangement comprising a single optical waveguide member.

Means of Solving the Problems

In order to achieve the above object, a linear lighting apparatus according to an aspect of the present invention includes the following arrangement.

There is provided a linear lighting apparatus comprising a rod-like optical waveguide member formed by a transparent material, a light source provided near an end face of the optical waveguide member in a longitudinal direction, and a light exit surface formed on at least part of a side surface of the optical waveguide member in the longitudinal direction, characterized in that a sectional structure of the optical waveguide member in a widthwise direction perpendicular to the longitudinal direction includes:

a light exit surface, a plurality of reflecting areas provided at positions to face the light exit surface, and at least one optical barrier provided at a boundary portion between the plurality of reflecting areas, wherein illumination light beams exiting from the light exit surface have different focal points.

In order to achieve the above object, a linear lighting apparatus according to an aspect of the present invention includes the following arrangement.

There is provided a linear lighting apparatus comprising an optical waveguide member having an optical waveguide portion which is formed by a transparent material and guides light from a light source placed near an end face of the optical waveguide member in a longitudinal direction, and a light exit portion which applies light from the optical waveguide portion to the outside, characterized in that a sectional structure of the light exit portion in a widthwise direction perpendicular to the longitudinal direction comprises a light exit surface, a plurality of light reflecting surfaces provided at positions to face the light exit surface, and at least one optical barrier provided at a boundary portion between the plurality of light reflecting surface.

Note that the means of solving the problems does not include all the feature of the present invention, and other claims described in the scope of claims and a combination of features of the claims can constitute inventions.

Effects of the Invention

According to the present invention, the illumination width of the read surface of a document in the sub-scanning direction can be increased by a single optical waveguide member, and the illuminance depth can be increased. Therefore, it is possible to properly capture even a document image at a position spaced apart from the document table while suppressing an increase in cost.

BRIEF DESCRIPTION OF DRAWINGS

FIG. 5 is a graph explaining the illuminance depth characteristic of the linear lighting apparatus according to the first embodiment;

FIG. 6 is a graph explaining the relationship between the height of a document support table in the linear lighting apparatus according to the first embodiment and the illuminance distribution in the sub-scanning direction;

FIG. 8 is a graph showing the illuminance distribution characteristic of the conventional optical waveguide member shown in FIG. 7;

BEST MODE FOR CARRYING OUT THE INVENTION

The preferred embodiments of the present invention will be described in detail below with reference to the accompanying drawings. The following embodiments do not limit the present invention according to the appended claims, and not all combinations of characteristic features described in the embodiments are essential to the solving means of the present invention.

A linear lighting apparatus according to this embodiment is characterized by having a plurality of light reflecting areas (to be simply referred to as reflecting areas hereinafter) unlike the conventional structure of a reflecting surface.

[First Embodiment]

Figure 1:
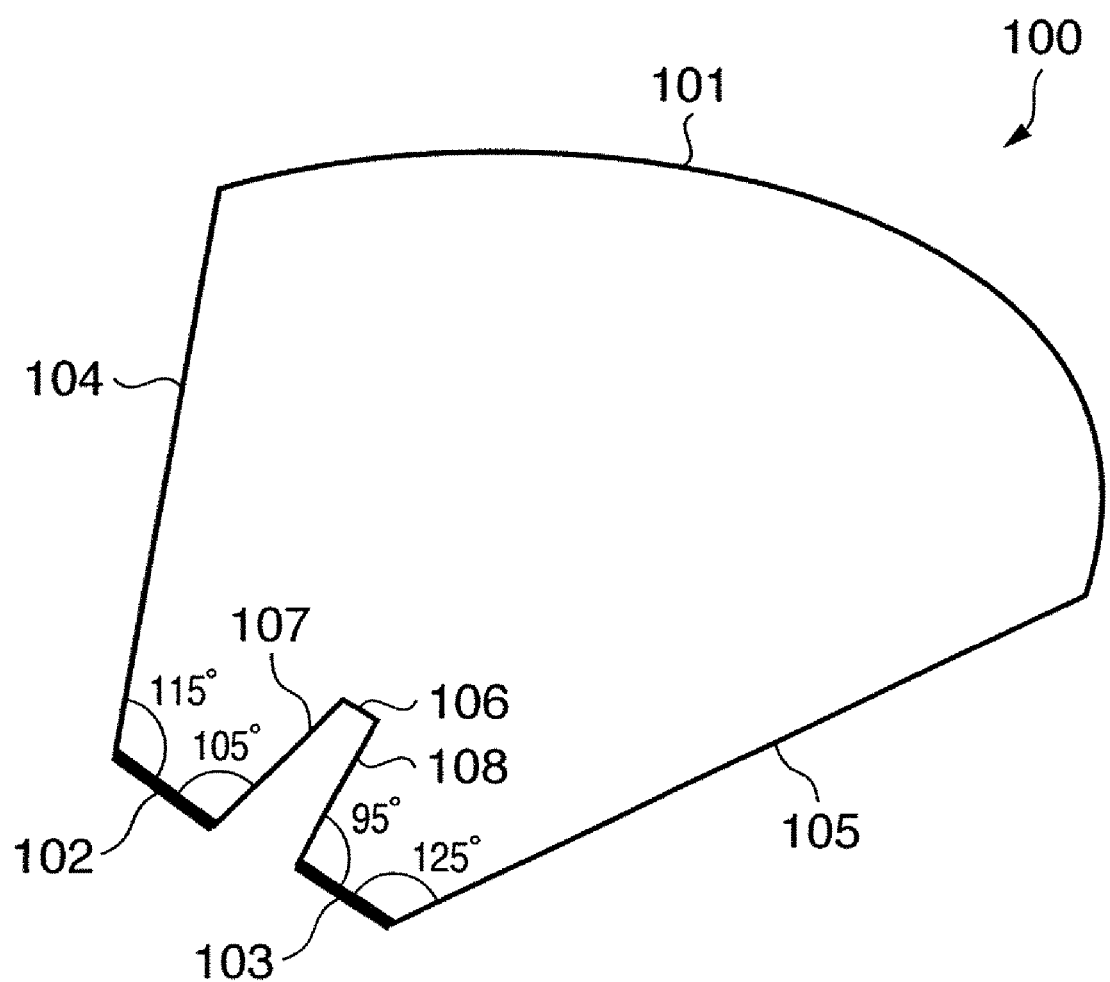
FIG. 1 depicts a view explaining a sectional shape of an optical waveguide member used in a linear lighting apparatus according to embodiments of the present invention.
Figure 2:
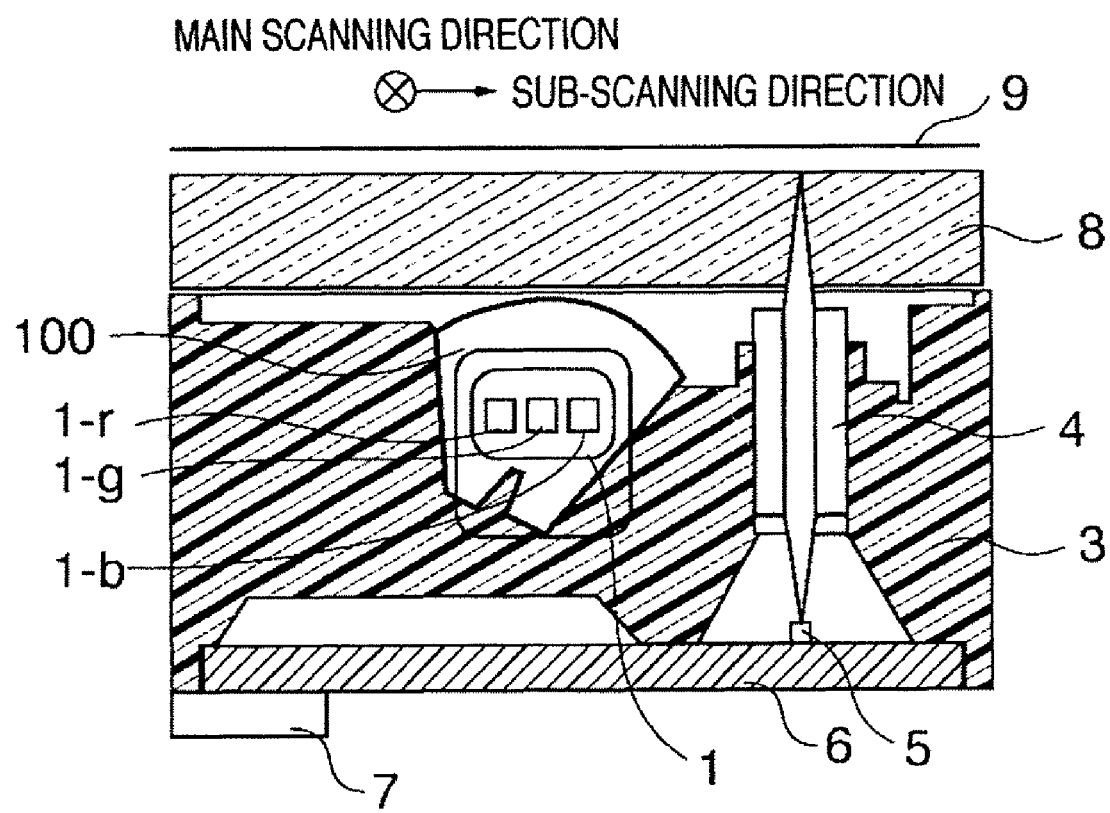
FIG. 2 depicts a sectional view of the linear lighting apparatus using the optical waveguide member according to the first embodiment.

FIG. 1 depicts a view explaining the sectional shape of an optical waveguide member 100 used in a linear lighting apparatus according to an embodiment of the present invention. FIG. 2 depicts a sectional view of the linear lighting apparatus using the optical waveguide member 100. The same reference numerals as in FIG. 2 denote the same parts in FIG. 12, and a description of them will be omitted.

The optical waveguide member 100 is designed to provide light for linearly illuminating a document 9 and forming the reflected light into an image on a photoelectric conversion element 5 via a lens array 4. The optical waveguide member 100 according to the first embodiment is dimensioned such that the maximum width of a cross section in the widthwise direction is about 5 mm, and the length in the longitudinal direction is about 22 cm.

The shape of the optical waveguide member 100 according to the first embodiment comprises a light exit surface 101 which is a curved surface, reflecting areas 102 and 103, side surfaces 104 and 105, and surfaces 107 and 108 constituting an optical barrier portion (to be simply referred to as a barrier hereinafter) 106 which separates the two reflecting areas 102 and 103. A cross section of the optical waveguide member 100 which is perpendicular to the longitudinal direction has an almost sector form, and the light exit surface 101 is a convex curved surface with nonuniform curvature. The reflecting areas 102 and 103 are formed on a bottom portion of the optical waveguide member 100 so as to be located on the two sides of the barrier 106. A light source unit 1 having tricolor LEDs is placed on or near an end face of the optical waveguide member 100 of the linear lighting apparatus according to the first embodiment in the longitudinal direction.

Figure 12:
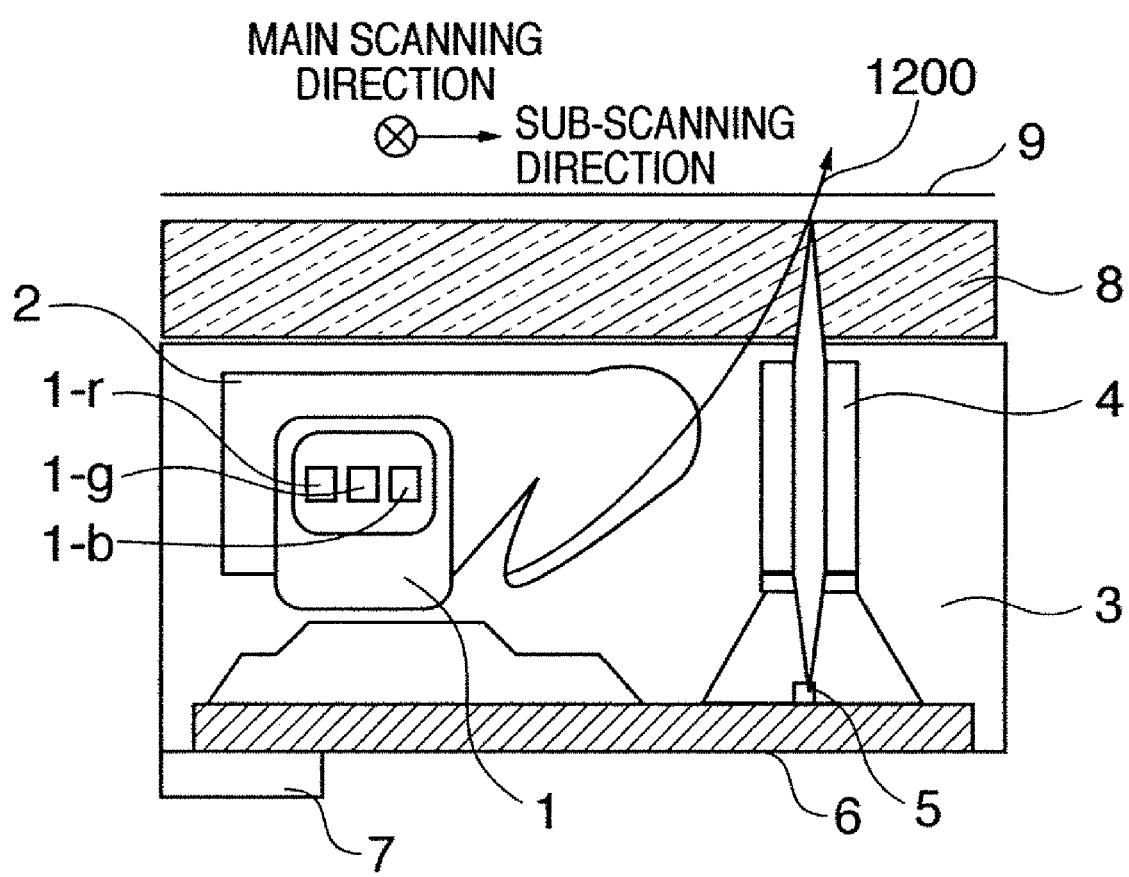
FIG. 12 depicts a sectional view explaining the arrangement of a conventional contact image sensor.

Referring to FIG. 2, the light source unit 1 is placed on an end portion of the optical waveguide member 100 in the longitudinal direction as in the case shown in FIG. 12. However, since the optical waveguide portion of the optical waveguide member 100 is not large unlike the case shown in FIG. 12, the light source unit 1 is directly provided on a side surface of the optical waveguide member 100.

Figure 3A:
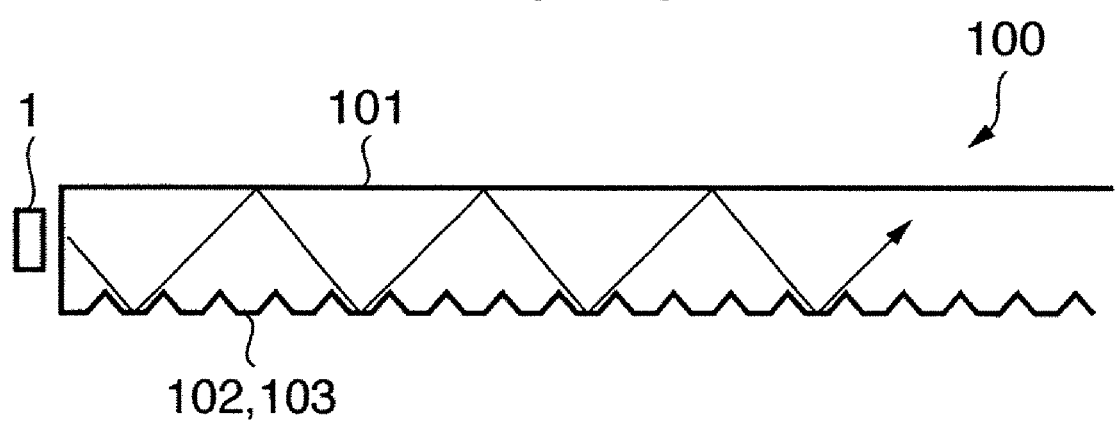
FIGS. 3A and 3B are sectional views for explaining how light propagates in the longitudinal direction of the optical waveguide member according to the first embodiment.
Figure 3B:
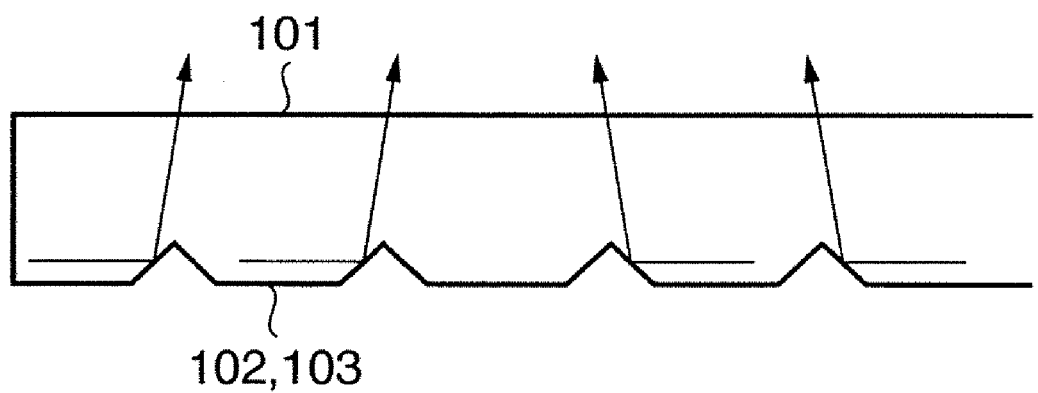

FIGS. 3A and 3B depicts sectional views explaining how light propagates in the longitudinal direction of the optical waveguide member 100.

Cross sections of regions of the light exit surface 101 of the optical waveguide member 100 which face the reflecting areas 102 and 103 are convex curved surfaces, which cause light beams from the reflecting areas 102 and 103 to exit in predetermined directions owing to a convex lens effect. Micro prisms called "lolet" like those shown in FIGS. 3A and 3B are formed on the reflecting areas 102 and 103 of the optical waveguide member 100. These micro prisms function to scatter light beams in the longitudinal direction of the optical waveguide member 100 and change the propagating directions of light beams so as to reflect the light beams in the direction of the light exit surface 101 formed on the opposite surface to the prisms. FIG. 3B is an enlarged view of FIG. 3A. Note that the light beams propagating from the right in FIG. 3B indicate reflected light beams from the opposite-side end portion on which the light source unit 1 of the optical waveguide member 100 is placed. A reflecting member, preferably an aluminum foil or the like, is provided on this opposite-side end portion.

In this embodiment, the barrier 106 serving as an optical barrier is formed inside the optical waveguide member 100 so as to separate the two reflecting areas 102 and 103. Changing the shapes and heights of the surfaces 107 and 108 shown in FIG. 1 makes it possible to control the mixing of light beams reflected by the two reflecting areas 102 and 103. That is, of the light beams reflected by the reflecting areas 102 and 103, light beams striking the reflecting areas 102 and 103 at small angles are reflected by the surfaces of 107 and 108 of the barrier and hence cannot reach the light exit surface 101. In this case, most of the light beams input to the reflecting areas 102 and 103 strike them at large angles, and hence the light beams reflected by the reflecting areas 102 and 103 directly reach the light exit surface 101. The light beams then exit from the light exit surface 101 and can be applied to the document 9. Increasing the height of the barrier 106 will apply light beams from the two reflecting areas 102 and 103 onto the document 9 via different paths. In this manner, this structure has the same effects as those of a structure having two optical waveguide members having different focal points in a pseudo manner.

A characteristic feature of this embodiment is that the two reflecting areas 102 and 103 have different tilt angles with respect to a document to be read. As shown in FIG. 1, the angle defined by the side surface 104 and the reflecting area 102 is 115°, and the angle of the side surface 107 with respect to the reflecting area 102 is 105°. Likewise, the angle defined by the side surface 105 and the reflecting area 103 is 125°, and the angle defined by the reflecting area 103 and the surface 108 is 95°. Note that these angles are merely examples, and do not limit the present invention.

For example, as shown in FIGS. 3A and 3B, a plurality of projecting portions which are micro prisms are formed on the reflecting areas 102 and 103 in the longitudinal direction of the optical waveguide member 100. Both FIGS. 3A and 3B are sectional views of the reflecting area 102 or 103 along the longitudinal direction of the optical waveguide member 100. As described above, projecting portions and flat portions are alternately arranged on the reflecting areas 102 and 103 along the longitudinal direction of the optical waveguide member 100. Of these portions, the flat portions diffuse light into the optical waveguide member 100 while reflecting light from the light source unit 1, according to the reflection principle, which strikes the optical waveguide member 100 at angles equal to or smaller than the total reflection angle (about 42° when the member is made of an acrylic material) (see FIG. 3A). As shown in FIG. 3B, the projecting portions serve to reflect light parallel to the flat portions toward the direction of the light exit surface 101.

As described above, the reflecting areas 102 and 103 have the flat portions and projecting portions, and the surfaces of the projecting portions obviously have angles with respect to the surfaces of the flat portions. For the sake of convenience, the reflecting areas used in the present application indicate the flat portions on which no projecting portions are formed. In the strict sense, however, the reflecting areas indicate the entire areas including both the flat end portions and the projecting portions.

Figure 4A:
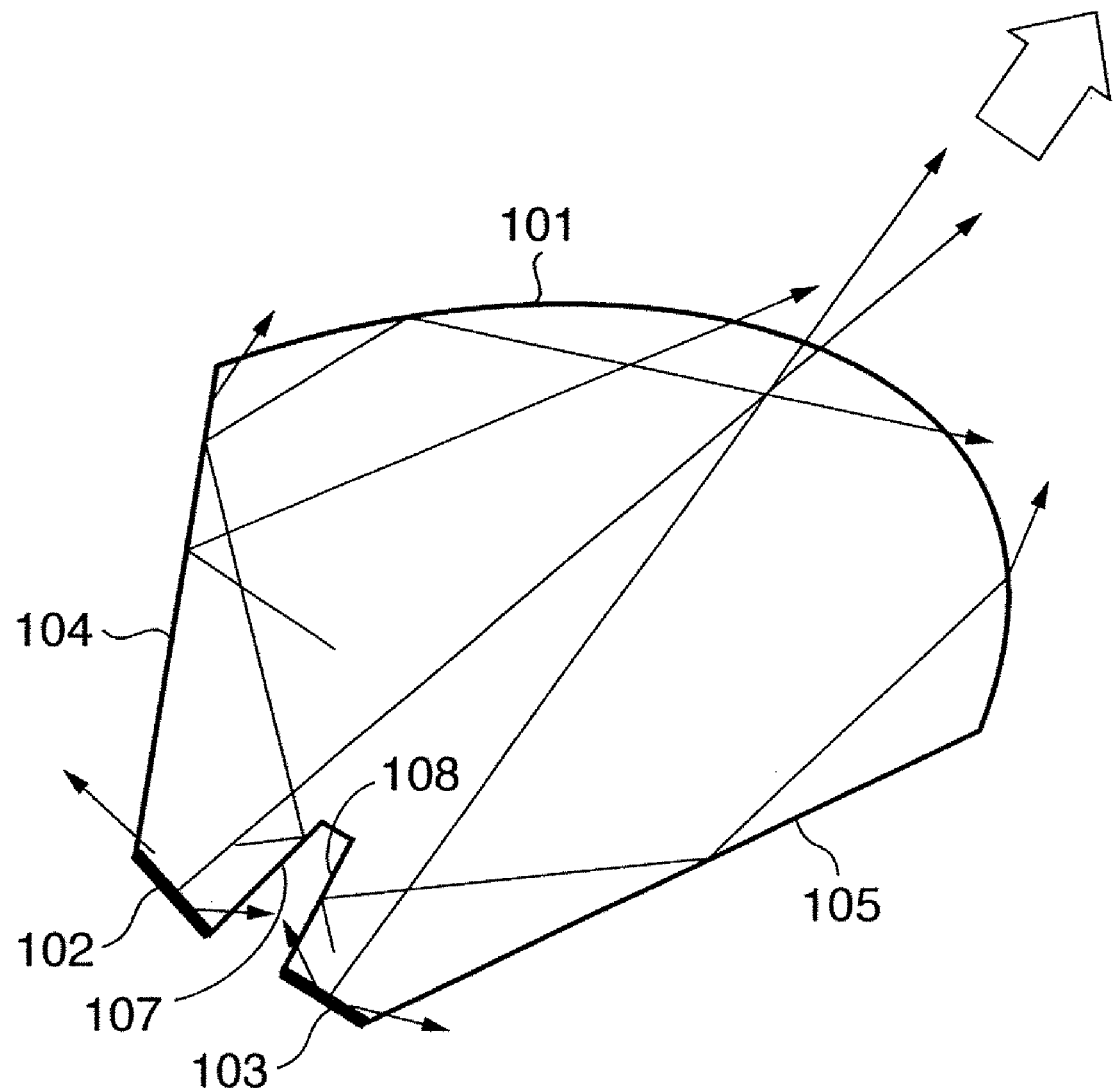
FIGS. 4A and 4B depict views explaining an optical path image of light exiting from a CIS using the linear lighting apparatus according to the first embodiment.

FIG. 4A depict a view explaining an optical path image of exit light in the optical waveguide member according to this embodiment.

The light which is emitted from the light source unit 1 and strikes an end face of the optical waveguide member 100 exits from the light exit surface 101 at the upper portion upon being repeatedly reflected inside the member and reflected by the reflecting areas 102 and 103. In this case, the optical waveguide member 100 is molded by transparent acrylic resin. The light striking the optical waveguide member 100 is applied to the inside of the optical waveguide member 100 or reflected to the outside of the optical waveguide member 100 by refraction between air and the optical waveguide member 100. In addition, light beams propagating from the inside of the optical waveguide member 100 to the outside of the optical waveguide member 100 are totally reflected to return to the inside of the optical waveguide member when the angles of the light beams are equal to or smaller than the total reflection angle (about 42°). Light beams with larger angles are reflected by or transmitted through the optical waveguide member 100 to exit from it at a certain proportion. The light exiting from the optical waveguide member 100 in this manner can be used as illumination light for a document.

Referring to FIG. 4A, since reflected light beams propagating from the reflecting areas 102 and 103 to the light exit surface 101 strike the light exit surface 101 at large angles, most of the light beams exit to the outside and are used as illumination light.

In contrast, the light reflected by the side surface 104 and applied to the light exit surface 101 is separated into light reflected by the inside of the optical waveguide member 100 and light exiting from the optical waveguide member 100 to the outside depending on the incident angles. Part of the exit light is used as illumination light for a document. In addition, the light reflected by the side surface 105 and applied to the light exit surface 101 strikes the light exit surface 101 at large angles, and hence most of the light exits to the outside of the optical waveguide member 100 and becomes illumination light.

The shape of the light exit surface 101 according to this embodiment will be described next.

The radius of curvature of the light exit surface 101 according to this embodiment is large near the side surface 104, and the light exit surface 101 abuts on the side surface 104 with a clear inflection point. For this reason, most of the light reflected by the side surface 104 strikes the light exit surface 101 at angles equal to or smaller than the total reflection angle. This makes it easy for the light reflected by the side surface 104 to be reflected to the inside of the optical waveguide member. On the other hand, as shown in FIG. 4A, the radius of curvature of the light exit surface 101 near the side surface 105 is smaller than that near the side surface 104. This causes most of the light reflected by the side surface 105 or the side surface 104 to strike the light exit surface 101 near the side surface 105 at relatively large angles. For this reason, as shown in FIG. 4A, these light beams exit to the outside via the light exit surface 101 having a large radius of curvature.

Of the light beams reflected by the reflecting areas 102 and 103, some light beams leak to the outside of the optical waveguide member without being reflected by the side surfaces 104 and 105 near them. This is because the reflected light beams from the reflecting areas 102 and 103 strike the side surfaces 104 and 107 on the two sides of the reflecting area 102 and the side surfaces 105 and 108 on the two sides of the reflecting area 103 at large angles. As the incident angles increase in this manner, reflected light exits to the outside of the optical waveguide member 100 via the side surfaces without being reflected by them to become leak light. Particularly when the angles defined by the reflecting areas and the side surfaces are 90° or less (acute angles), such leak light increases in amount. Therefore, such angles are undesirable. For this reason, this embodiment makes the angles defined by the respective reflecting areas and the side surfaces obtuse (maximizes the angles) to reduce the amount of light leaking to the outside of the optical waveguide member 100 near the reflecting areas. This can make as much reflected light as possible strike the light exit surface 101.

If, however, these angles are too large, the area of the light exit surface 101 becomes too large. This makes it impossible to limit the direction of exit light. Therefore, the largest divergence angle is determined by restrictions such as focusing conditions for the lighting apparatus. It is not preferable to set an excessively large divergence angle.

Figure 4B:
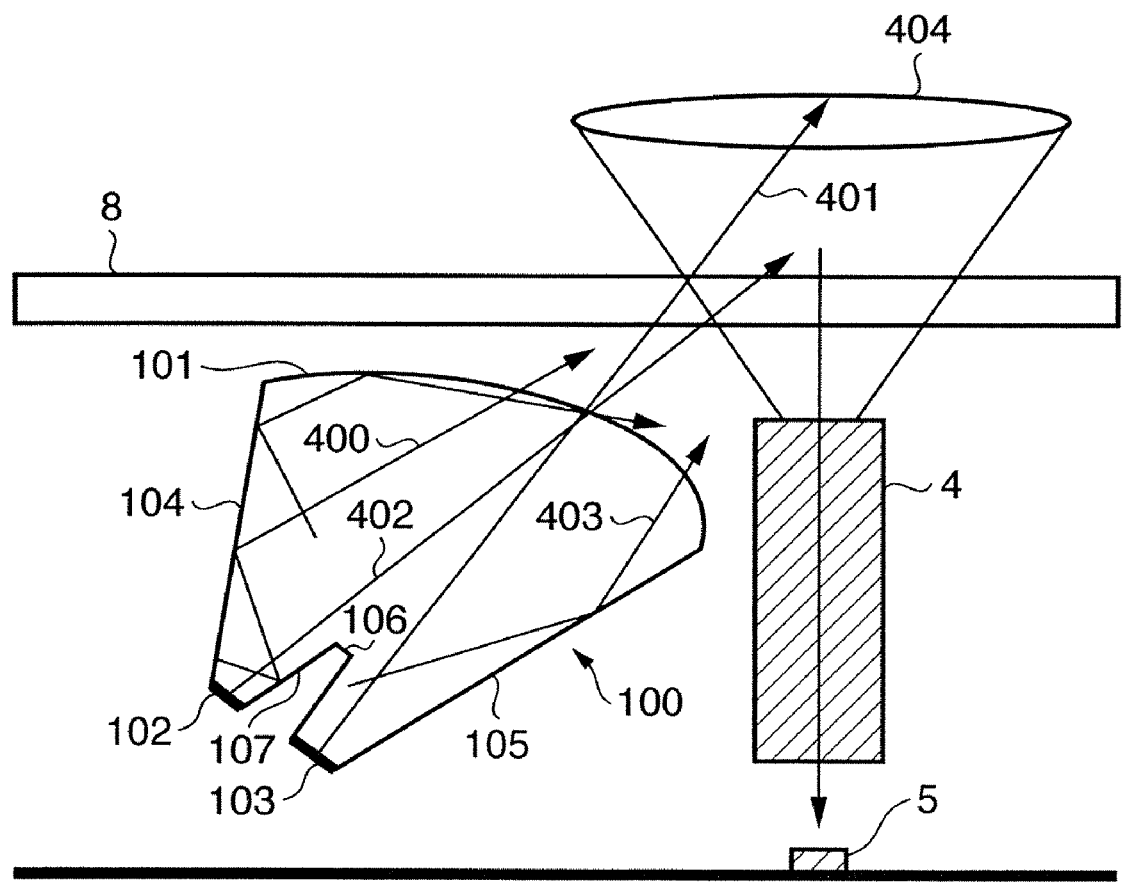

FIG. 4B depicts a view showing the schematic arrangement of the lighting apparatus using the optical waveguide member 100 according to this embodiment.

Light exiting from the light exit surface 101 of the optical waveguide member 100 is reflected by a document surface. Of the reflected light, light which can be focused by the lens array 4 is determined by the focusing angle of the lens array 4. Since the focusing angle of the lens array is over ten degrees, light which can be focused is limited to reflected light near the optical axis of the lens array 4.

As shown in FIG. 4B, reflected light from the reflecting area 102 strikes a document support table 8 at a small angle and is applied to a document on the document support table 8. On the other hand, reflected light from the reflecting area 103 strikes the document support table 8 at an angle larger than that of the reflected light from the reflecting area 102. This allows reflected light from the reflecting area 103 to be focused even at a high position apart from the document support table 8. As a consequence, reflected light from the reflecting area 102 serves to increase the irradiation range in the sub-scanning direction (the lateral direction in FIG. 4B), and reflected light from the reflecting area 103 can be used to irradiate a document at a high position apart from the document support table 8.

As described above, according to the first embodiment, the single optical waveguide member 100 can generate illumination light having the above two illuminance characteristics.

The LEDs as a light source are arranged on the end surface portion of the optical waveguide member 100 so as to be in contact with or near the end face. The light source comprising the red, green, and blue LEDs is placed such that the center (LED 1-g) coincides with almost the central portion of the sectional shape in FIG. 1.

In the optical waveguide member 100 according to the first embodiment shown in FIG. 1, the reflecting areas 102 and 103 are formed at two positions, the angle of the reflecting area 102 is slightly tilted toward the lens array 4 (FIG. 4B) relative to the reflecting area 103. That is, the normal lines of the reflecting areas 102 and 103 are set to intersect near the document support table 8. This makes it possible to focus more reflected light from the reflecting area 102 for the document support table 8. This can increase the irradiation width in the sub-scanning direction and increase the illuminance on the document support table 8.

Referring to FIG. 4B, the light reflected by the reflecting area 102 includes light which propagates straight and exits and light which is reflected by the side surface 104 and strikes the document support table 8 at a small angle. At this time, the light reflected by the reflecting area 102 at a small angle and further reflected by the side surface 104 is blocked by the side surface 107 of the barrier 106, and hence cannot propagate toward the reflecting area 103. This allows the respective optical waveguide portions separated by the barrier 106 to function as if they were independent optical waveguide members. In addition, changing the height (depth) of the barrier 106 can change the focusing characteristic of the respective optical waveguide portions.

An optical path 400 is an optical path through which light reflected by the side surface 104 of the optical waveguide member 100 propagates at a small angle (<30°) with respect to the document support table 8. An optical path 402 is an optical path through which reflected light from the reflecting area 102 propagates at a small angle (<30°) with respect to the document support table 8. The light applied by the optical paths 400 and 402 is reflected by the document and reaches the sensor array 5 via the lens array 4. An optical path 401 is of reflected light from the reflecting area 103, which strikes the document support table 8 at a relatively large angle. Light on an optical path 403 is reflected by the side surface 105 of the optical waveguide member 200 and strikes the document support table 8 at a larger angle. However, reflected light which strikes the document support table 8 at an excessively large angle tends to strike the sensor array 5 via the lens array 4. As a result, the reflected light intensity increases, and a document image on the corresponding portion is mistaken for a white portion. Therefore, an excessively large incident angle is not preferable.

Of these light beams, only light beams within the range of a limited aperture angle 404 can be focused by the lens array 4. For this reason, of the light striking the document support table 8 at a large angle, components reflected near the document support table 8 fall outside the aperture angle 404 of the lens array 4, and hence are not focused. Only reflected light at a high position apart from the document support table 8 is focused. Therefore, reflected light on the optical paths 400 and 402 is focused as reflected light near the document support table 8, and reflected light on the optical paths 401 and 403 is focused as reflected light from a document portion floating high from the document support table 8.

FIG. 5 is a graph for explaining the illumination width/illumination depth characteristic of the linear lighting apparatus according to the first embodiment in the sub-scanning direction. This graph represents the relationship between the illuminance and the height (d) from the document support table 8 relative to the position of a document surface in the sub-scanning direction. Referring to FIG. 5, reference numeral 500 denotes the illuminance at a position(d=0) on the document support table 8 in the sub-scanning direction; numeral 501 denotes the illuminance at a position 5 mm above the document support table 8 in the sub-scanning direction; and numeral 502 denotes the illuminance at a position 10 mm above the document support table 8 in the sub-scanning direction. In addition, the ordinate represents the illuminance when the relative illuminance on the document support table 8 is "1.0".

It is obvious from FIG. 5 that there are two illuminance peaks on the document support table 8 in the sub-scanning direction, and the width in the sub-scanning direction within which the illuminance is "0.8" or more is about 3 mm . In addition, the maximum illuminance at the position 5 mm above the document support table 8 is "about 0.7", and the maximum illuminance at the position 10 mm above the document support table 8 is "about 0.5". It is also obvious that even at the positions 5 mm and 10 mm above the document support table 8, the portions where the illuminance is "0.3" or more have widths of about 2 mm . Obviously, the illuminance above the document support table 8 is greatly increased as compared with the comparative example to be described later.

In this case, the illuminance peak near −1.5 mm in the sub-scanning direction is attributed to light mainly composed of reflected light from the reflecting area 102, and the illuminance peak near 0 mm in the sub-scanning direction is attributed to light mainly composed of reflected light from the reflecting area 103. Therefore, the shapes of these two illuminance peaks can be changed by changing the widths or angles of the reflecting areas 102 and 103. For example, the position where the normal lines of the reflecting areas 102 and 103 intersect is changed by changing the relative angles of the two reflecting areas in the acute angle direction. Bringing the respective illuminance peak positions closer to each other can increase the illuminance at the irradiation position. Furthermore, this can increase the illuminance distribution on the document support table 8 in the height direction.

FIG. 6 depicts a graph for explaining the relationship between the illuminance and the height above the document support table 8 in the linear lighting apparatus according to the first embodiment. As is obvious from FIG. 6, even at the position 10 mm above the document support table 8, an illuminance of about "0.5" can be obtained.

[Second Embodiment]

Making two reflecting areas 102 and 103 parallel to each other or changing their relative angles in the obtuse angle direction can prevent normal lines passing through the centers of the reflecting areas 102 and 103 from intersecting on the light exit surface side. With this operation, the two illuminance peaks in the sub-scanning direction move in the direction to separate from each other. As a consequence, the illuminance width in the sub-scanning direction can be increased.

Figure 14:
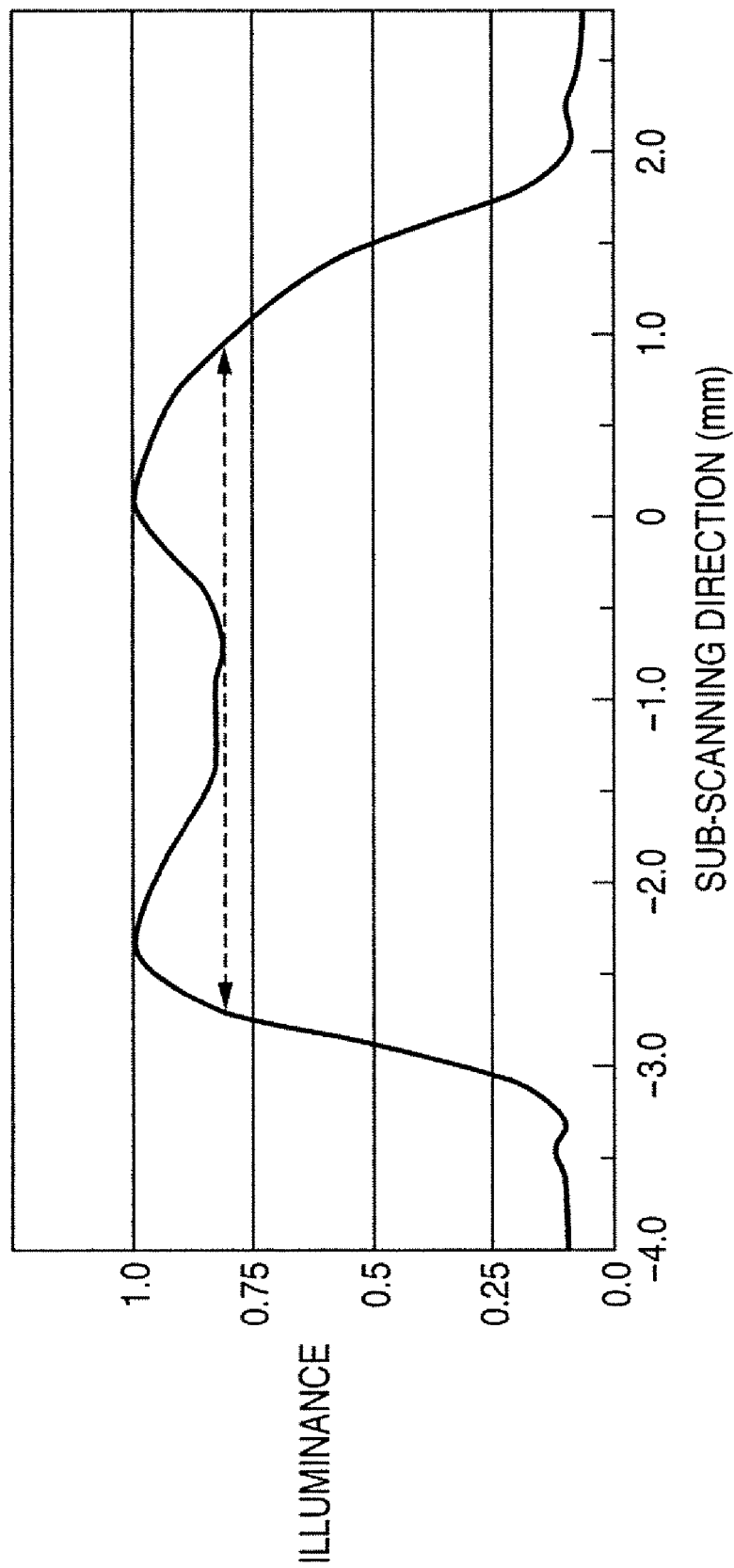
FIG. 14 is a graph explaining an illuminance characteristic according to the second embodiment of the present invention.

FIG. 14 is a graph for explaining illuminance characteristics according to the second embodiment of the present invention.

This graph shows the illuminance on the document support table 8 when the two reflecting areas 102 and 103 are made almost parallel to each other. More specifically, the angle of the reflecting area 102 shown in FIG. 1 is changed to make it almost parallel to the reflecting area 103. As a result, owing to reflected light from the reflecting area 102, an illuminance peak occurs near −0.2 mm in the sub-scanning direction. In addition, owing to reflected light from the reflecting area 103, an illuminance peak occurs near +1 mm . The width of the region in which the illuminance is 0.8 or more in the sub-scanning direction is about 4 mm . Obviously, the illuminance width in the sub-scanning direction becomes larger. In addition, as in the first embodiment, since reflected light from the reflecting area 103 irradiates a point above a document support table 8, the illuminance depth in the height direction can be increased.

A linear lighting apparatus using an optical waveguide member 100 according to this embodiment can arbitrarily change the direction or intensity of exit light as in a case in which two optical waveguide members are used. In addition, since the illuminance depth is large, even a document 9 floating from the document support table 8 can be properly irradiated with light and read. This produces an effect of greatly reducing the ratio of a portion displayed in black when the read document is printed.

COMPARATIVE EXAMPLE

Figure 7:
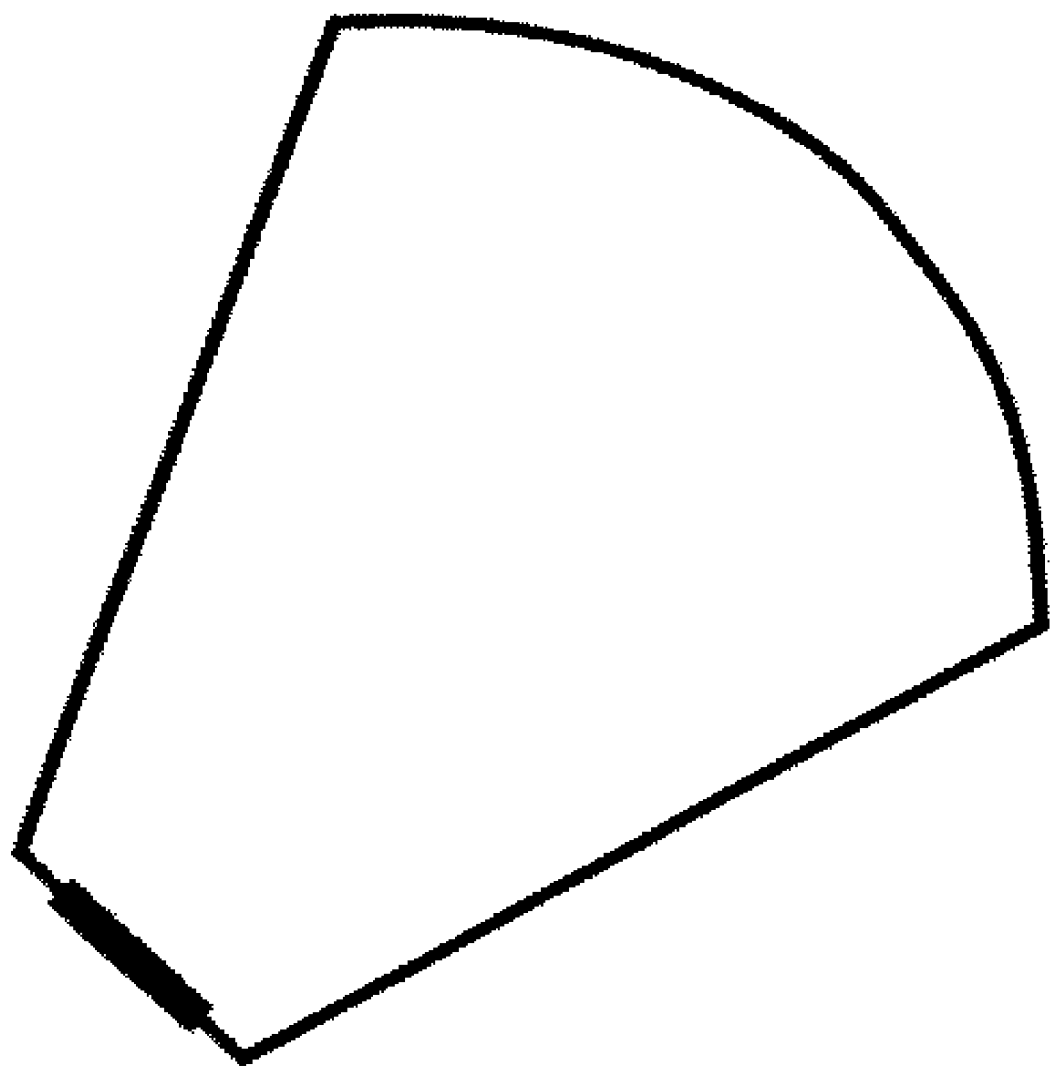
FIG. 7 depicts a view explaining the sectional structure of a conventional optical waveguide member.

FIG. 7 depicts a view explaining the sectional structure of a conventional optical waveguide member in the widthwise direction.

This structure differs from the structure of the optical waveguide member 100 according to the first and second embodiments described above in that only one reflecting area is formed on the bottom surface, and there is no barrier which separates the reflecting area into a plurality of areas. The light exit surface has a curved surface which is convex in the light exiting direction, and serves to focus exit light in a specific direction. Note, however, that the radius of curvature of the light exit surface does not change unlike the embodiments described above. The position of a light source unit is the same as that in the first embodiment, and is aligned with almost the center of the width of an end portion of the optical waveguide member as in the first embodiment.

Figure 13:
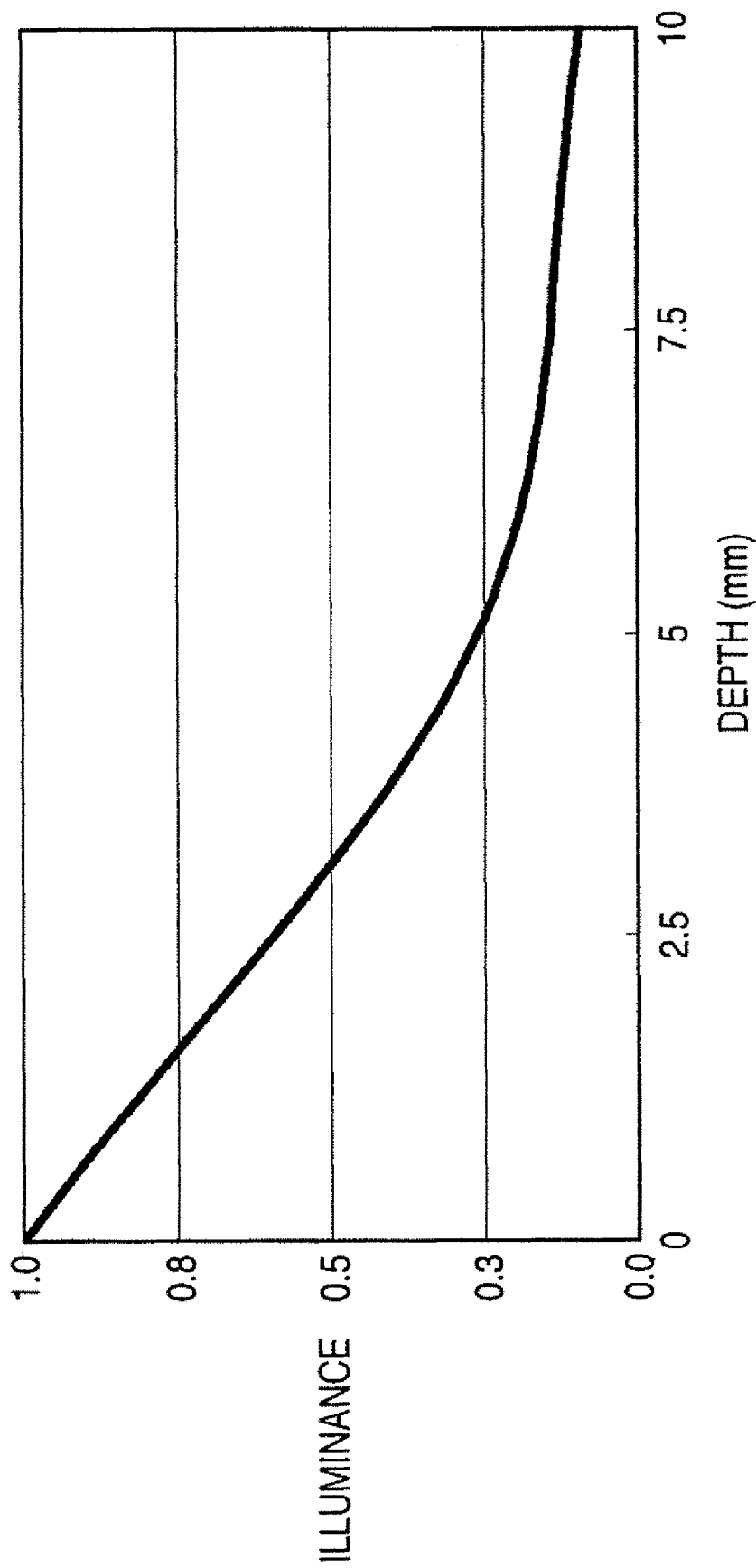
FIG. 13 is a graph showing an illuminance characteristic with respect to a document in a conventional lighting apparatus in the height direction.

FIG. 8 is a graph showing the illuminance distribution characteristic of the conventional optical waveguide member shown in FIG. 7 in the sub-scanning direction. FIG. 13 described above is a graph for explaining the relationship between the illuminance and the height from the document support table in the linear lighting apparatus using the conventional optical waveguide member.

Referring to FIG. 8, reference numeral 800 denotes the illuminance at a position (d=0) on the document support table 8 in the sub-scanning direction; numeral 801 denotes the illuminance at a position (d=5 mm) 5 mm above the document support table 8 in the sub-scanning direction; and numeral 802 denotes the illuminance at a position (d=10 mm) 10 mm above the document support table 8 in the sub-scanning direction. In addition, the ordinate represents the illuminance when the relative illuminance on the document support table 8 is "1.0".

It is obvious from this graph that as the distance from the document support table 8 increases, the illuminance decreases. In addition, as the height changes, the light amount distribution greatly shifts in the sub-scanning direction. When the illuminance change of the optical waveguide member in FIG. 6 described above is compared with that shown in FIGS. 8 and 13, it is obvious that as the height of a document increases (floats more from the table), the attenuation amount of illuminance increases.

When the characteristics shown in FIG. 8 are compared with the above embodiments, the width in the sub-scanning direction within which the illuminance on the document support table 8 is "0.8" or more is only about 2 mm, and there is only one illuminance peak, which is small in width. In addition, when the document floats from the document support table 8 by 5 mm, the illuminance is reduced to almost half. At the position 10 mm above the table, the illuminance is almost zero.

FIG. 13 is a graph showing the depth characteristic of the optical waveguide member in which the illuminance is plotted with respect to the distance from the document support table. When FIG. 13 is compared with FIG. 6 described above, it is obvious that in FIG. 13 showing the prior art, as the document floats more from the table, the illuminance abruptly decreases.

In the optical waveguide member 100, the reflecting areas 102 and 103 and the side surfaces 104 and 105 can be almost flat surfaces or curved surfaces. In addition, the shape of the reflecting areas 102 and 103 is not limited to a flat shape but can be modified into several shapes.

[Third Embodiment]

An optical waveguide member according to the third embodiment of the present invention will be described next.

Figure 9A:
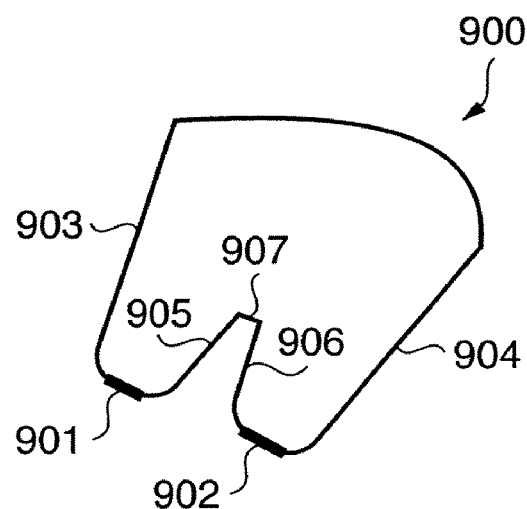
FIGS. 9A, 9B, and 9C depict views each showing the shape of the optical waveguide member according to the second embodiment of the present invention.
Figure 9B:
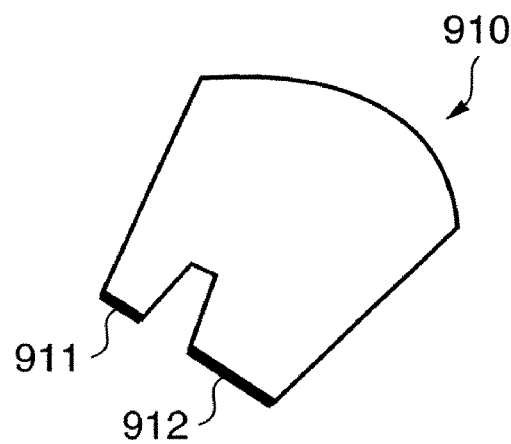
Figure 9C:
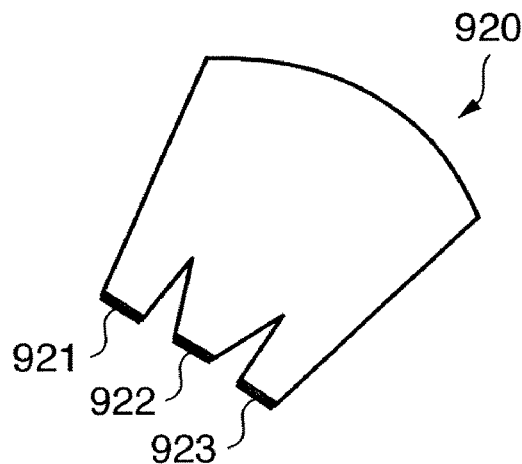

FIGS. 9A to 9C depict views each showing the shape of the optical waveguide member according to the third embodiment of the present invention. It is important for the optical waveguide member according to this embodiment to have a plurality of independent reflecting areas. It is possible to select, as the shape of this optical waveguide member, one of several shapes in accordance with the purpose.

Referring to FIG. 9A, although two reflecting areas 901 and 902 are flat, this embodiment is characterized in that the two end portions of the respective reflecting areas are curved. That is, the two ends of the reflecting area 901 which are continuous with a side surface 903 and a side surface 905 of a barrier 907 are curved surfaces. The two ends of the reflecting area 902 which are continuous with a side surface 904 and a side surface 906 of the barrier 907 are curved surfaces. As described above, when the corner portions of the end portions of the reflecting areas are linearly bent, light tends to leak to the outside from the side surfaces 104, 107, 108, and 105 adjacent to the reflecting areas 102 and 103 of the optical waveguide member, as shown in FIG. 4A. Therefore, curving the corner portions makes it possible to reduce the amount of light leaking to the outside from the corner portions of the bent portions and increase the use efficiency of light.

FIG. 9B depicts a view showing the shape of another optical waveguide member 910 according to the third embodiment. In this case, both reflecting areas 911 and 912 have linear shapes and have the same angle. The normal lines of the respective areas are parallel to each other. This structure is characterized in that the reflecting areas 911 and 912 have different widths. It is possible to control, in accordance with the widths, the amount of light which strikes a document support table 8 at a small angle and increases in irradiation width in the sub-scanning direction and the amount of light which strikes at a large angle and irradiates a portion above the document table. Referring to FIG. 9B, the width of the reflecting area 911 is smaller than that of the reflecting area 912. This reduces the amount of light, of light reaching the document support table 8, which irradiates the table at a small angle, while increasing the amount of light which is applied from the reflecting area 912 to a portion spaced apart upward from the document support table 8.

FIG. 9C depicts a view explaining another optical waveguide member according to the third embodiment. This view shows an example of an optical waveguide member 920 having three reflecting areas 921 to 923. These shapes are selectively used in accordance with the magnitude of illuminance and depth characteristics which are required on a document surface.

As describe above, using an optical waveguide member with the number or shapes of reflecting areas being changed makes it possible to apply light beams having different focal points by using the single optical waveguide member. This can improve the illuminance characteristics at positions spaced apart upward from the document support table 8. In addition, the illuminance width in the sub-scanning direction can be increased.

Although not shown, at least one of the side surfaces on the two sides of each reflecting area can be a curved surface. If these surfaces are curved surfaces, the lens effects of the mirror surfaces activate the light diffusion/focusing effect inside the optical waveguide member, thereby adjusting the direction and illuminance of exit light.

Although the shape of each projecting portion shown in FIG. 3A is preferably a serrated shape, they can be formed inside the optical waveguide member in the form of grooves. In addition, since the amount of light exiting from the light exit surface changes depending on the formation density of projections, it is preferable to increase the formation density of projections with an increase in the distance from the light source unit 1.

In addition, the reflection efficiency of each reflecting area can be further increased by coating it with metal ink containing aluminum foils.

[Fourth Embodiment]

Figure 10:
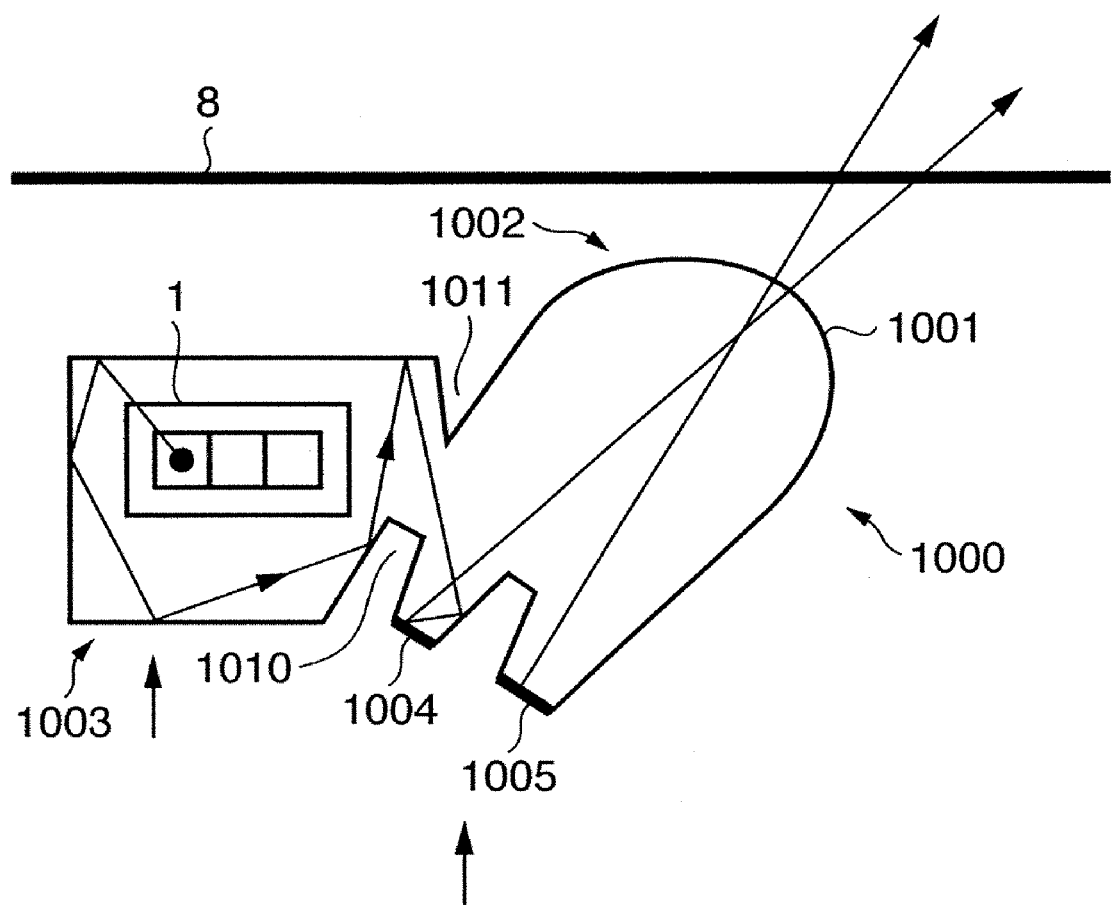
FIG. 10 depicts a sectional view showing the arrangement of a linear lighting apparatus using an optical waveguide member according to the third embodiment of the present invention.

FIG. 10 depicts a sectional view showing the arrangement of a linear lighting apparatus using an optical waveguide member 1000 according to the fourth embodiment of the present invention. The optical waveguide member 1000 has an optical waveguide portion 1003 and a light exit portion 1002 along the longitudinal direction like the conventional optical waveguide member shown in FIG. 12. Therefore, a sectional view of the lighting apparatus using the optical waveguide member 1000 is almost the same as the sectional shape of the lighting apparatus shown in FIG. 12.

The light which is emitted from the LEDs of a light source unit 1 placed at least near an end face of the optical waveguide member 1000 on one side and strikes the optical waveguide portion 1003 is repeatedly reflected by the inside of the optical waveguide member 1000, thereby guiding the light in the longitudinal direction. The light exit portion 1002 receives the light from the optical waveguide portion 1003 and causes linear light to exit from a light exit surface 1001 provided on part of the surface of the light exit portion 1002 in a predetermined direction, thereby illuminating the read portion of a document 9 on a document support table 8, as in the prior art.

The optical waveguide member 1000 has two reflecting areas 1004 and 1005, and is designed to increase the irradiation region and illuminance depth on the document support table 8, as in the first embodiment.

FIG. 10 shows an example of the optical waveguide portion 1003 and the light exit portion 1002 which are separate from each other. In this case, a barrier 1010 having a rectangular structure having a predetermined height is provided at a boundary portion between the optical waveguide portion 1003 and the light exit portion 1002, and a wedge-shaped barrier 1011 is provided at a position to face the barrier 1010. That is, the barriers 1010 and 1011 serve as a light amount control valve for light propagating from the optical waveguide portion 1003 to the light exit portion 1002. This can control the entrance of light from the optical waveguide portion 1003 to the light exit portion 1002. Note that the wedge-shaped barrier 1011 is configured to change its height in the longitudinal direction of the optical waveguide member 1000 in accordance with the distance from the light source unit 1. With this structure, the amount of light entering the light exit portion 1002 is controlled throughout the longitudinal direction of the optical waveguide member 1000.

The fourth embodiment is the same as the first embodiment described above in that the reflecting areas 1004 and 1005 are reflecting areas with different reflecting directions, and reflected light beams from the reflecting areas 1004 and 1005 exit in different directions.

The projections 1010 and 1011 arranged between the optical waveguide portion 1003 and the light exit portion 1002 reduce the amount of light which strikes the light exit portion 1002 once and return to the optical waveguide portion 1003. In addition, since light which returns from the optical waveguide portion 1003 to the light exit portion 1002 is efficiently used, the illuminance on a document can be increased as compared with the prior art.

[Fifth Embodiment]

A flatbed type image scanner using a lighting apparatus according to this embodiment will be described next.

Figure 11:
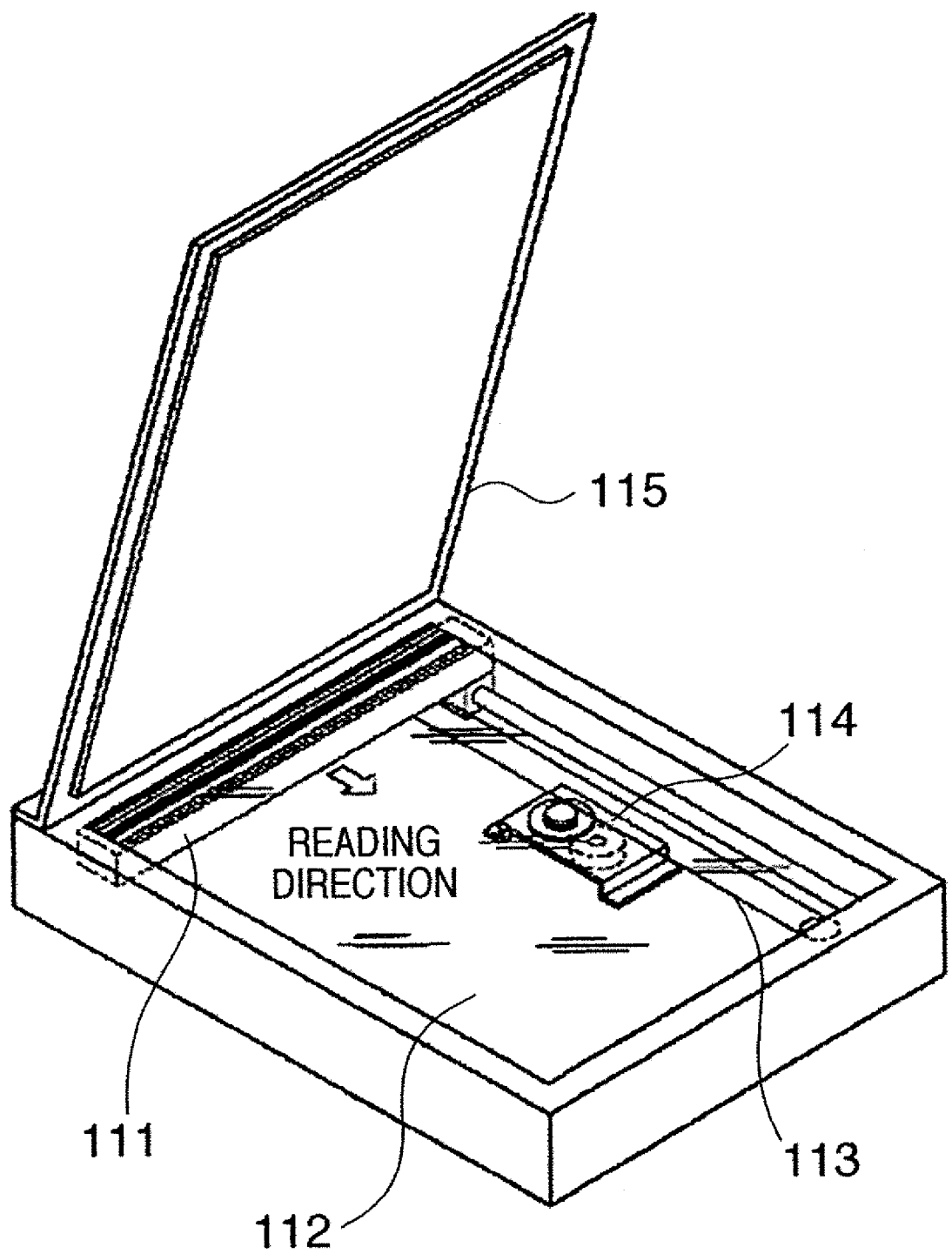
FIG. 11 depicts a schematic perspective view showing an image reader as an application of an image sensor according to the embodiments of the present invention.

FIG. 11 depicts a schematic perspective view showing an image reader as an application example of an image sensor according to this embodiment. The embodiment exemplifies a flatbed type image reader using a contact image sensor.

Referring to FIG. 11, reference numeral 111 denotes a CIS comprising the lighting apparatus according to any one of the first to third embodiments described above; numeral 112 denotes a glass plate (corresponding to the document support table 8 described above) which is a document support member; numeral 113 denotes a wire which actuates the CIS; numeral 114 denotes a driving motor for causing the CIS 111 to sweep by moving the wire 113; and numeral 115 denotes a platen which presses a document 9.

When the driving motor 114 rotates to mechanically move the wire 113, the CIS 111 moves in the reading direction (sub-scanning direction) to read image information on a document. The CIS 111 is formed as a sensor unit integrally incorporating a lighting unit. A lens array 4 of the CIS 111 focuses reflected light from an illuminated document onto a line sensor 5. With this operation, light is output as image information for each line. In this manner, the CIS can read an image on a sheet-like document and output the image information.

The image scanner incorporating the CIS unit according to this embodiment can provide easily viewable images while reducing the case that bound portions of books are printed in black when so-called book reading is performed.

Industrial Applicability

The lighting apparatus of the present invention can be applied to apparatuses which read documents, such as scanners, facsimile apparatuses, and copying machines.

The invention claimed is:

1. A linear lighting apparatus comprising: a rod-like optical waveguide member formed by a transparent material, a light source provided near an end face of the optical waveguide member in a longitudinal direction, and a light exit surface formed on at least part of a side surface of the optical waveguide member in the longitudinal direction, wherein a sectional structure of optical waveguide member in a widthwise direction perpendicular to the longitudinal direction, comprises:

the light exit surface;

two reflecting areas provided at positions to face the light exit surface ; and a barrier provided between the two reflecting areas, the barrier having two light reflection surfaces facing each other, wherein each light reflection surface merges with a respective reflecting area so that an angle between each light reflection surface and a respective reflecting area is an obtuse angle, wherein the two reflecting areas each comprise a plurality of projecting portions and flat portions alternately arranged at intervals in the longitudinal direction of the optical waveguide member, and the two reflecting areas are respectively provided at different angles with respect to a document to be read, and wherein illumination light beams exiting from the light exit surface have different focal points from each other.

2. The linear lighting apparatus according to claim 1, wherein the light exit surface is curved and radii of curvature of the light exit surface are different from each other on sides respectively facing one of the two reflecting areas and the other reflecting area of the two reflecting areas.

3. The linear lighting apparatus according to claim 1, wherein lengths of the two reflecting areas in the widthwise direction are different from each other.

4. The linear lighting apparatus according to claim 1, wherein boundary portions between outer end portions of the two reflecting areas in a widthwise direction, and respective side surfaces of the optical waveguide member, are curved surfaces.

5. The linear lighting apparatus according to claim 1, wherein a sectional shape of the optical waveguide member in the widthwise direction perpendicular to the longitudinal direction is a substantially sector form, and the light exit surface is formed along an outer periphery of the sector form.

6. An image reader comprising:

a linear lighting apparatus as defined in claim 1;

a driving unit that provides relative movement between the linear lighting apparatus and a document; and an image output unit that outputs image information in synchronism with movement by said driving unit.

* * * * *